United States Patent [19]

Cailloux

[11] 4,033,572
[45] July 5, 1977

[54] SHEET-PLATE POSITIONING DEVICE FOR MACHINE TOOLS

[75] Inventor: Paul Cailloux, Val de Marne, France
[73] Assignee: Promecam Sisson-Lehmann, Saint-Denis, France
[22] Filed: June 1, 1976
[21] Appl. No.: 691,408
[30] Foreign Application Priority Data
June 16, 1975  France .................................. 75.18708
[52] U.S. Cl. .............................. 269/320; 83/467 R
[51] Int. Cl.² ............................................ B23Q 3/00
[58] Field of Search .......... 269/303, 304, 315, 319, 269/320; 83/467, 468, 448

[56] References Cited
UNITED STATES PATENTS
3,125,140  3/1964  Nichols .................................. 83/467
3,690,642  9/1972  Angelstrond et al. .............. 269/320

Primary Examiner—Al Lawrence Smith
Assistant Examiner—Robert C. Watson
Attorney, Agent, or Firm—Michael J. Sriker

[57] ABSTRACT

This abutment device for the precision positioning of sheet-plates in a machine tool such as a shear or a bending-press comprises a pair of abutment arms movable depthwise for determining the sheet-plate position; these arms being each carried by a separate carriage adapted to be moved independently on a common transverse guide rail comprising two series of driving means for moving said carriage along said rail and the corresponding abutment arms depthwise, each carriage comprising two series of braking means for holding the carriage against movement on said rail and the relevant abutment arm on said carriage.

9 Claims, 3 Drawing Figures

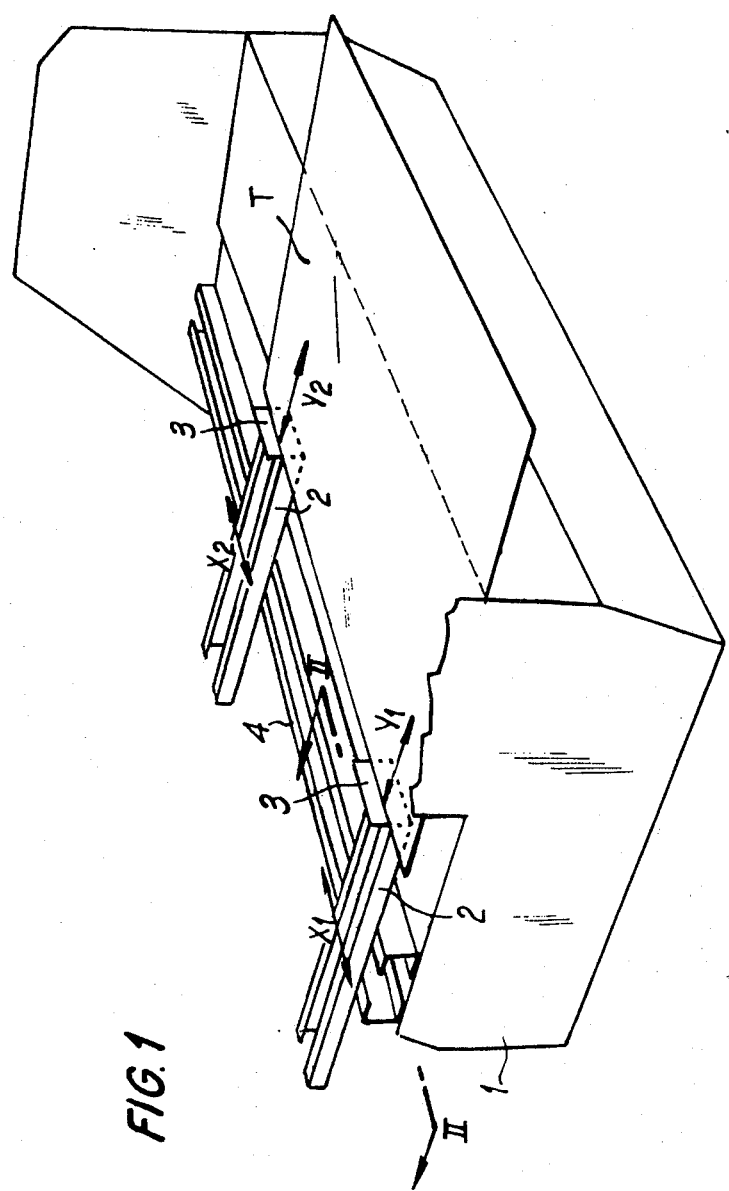

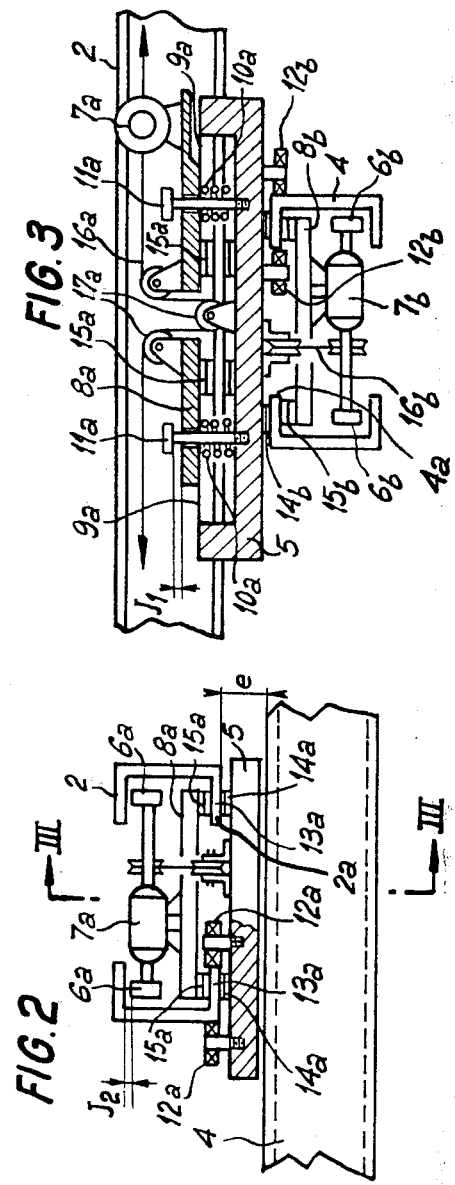

SHEET-PLATE POSITIONING DEVICE FOR MACHINE TOOLS

BACKGROUND OF THE INVENTION

1. Field of the Invention

This invention relates to adjustable stops or abutment members provided on machine tools such as bending presses, plate shears or the like in order to determine with precision the position of a sheet-plate to be processed.

2. Description of the Prior Art

Some of the hitherto known abutment devices equipping machine tools of the type concerned are particularly complicated in that they are designed with a view to accomplish a series of successive passes along different lines of operation of the machine. Therefore, these devices are uselessly improved for most of the works to be performed on conventional shears and bending presses.

On the other hand, abutment devices now currently used for standard operations are relatively rough and the operator must perform a number of operations for adjusting them before shearing or bending the sheet-plate. Moreover, in many cases the operator is compelled to move to the rear of the machine, which involves a considerable loss of time. On the other hand, when adjusting devices of this type it is scarcely possible to obtain a satisfactory degree of precision.

DESCRIPTION OF THE INVENTION

It is therefore the essential object of the present invention to provide an abutment device for the purpose set forth hereinabove which is designed with a view to be easily operated while affording a high degree of precision in the adjustment of the sheet-plate to be shaped, bent or sheared.

This device comprises a pair of movable abutment arms registering with the position contemplated for the sheet-plate and adapted to be moved depthwise for determining the sheet-plate position. However, this device is characterised essentially in that this pair of abutment arms are carried by a pair of separate carriages adapted to be moved independently of each other on a common transverse rail acting as a common support therefor and comprising two driving means adapted on the one hand to move said carriage along said rail and on the other hand to move the corresponding abutment arm depthwise, each carriage being also equipped with two series of braking means adapted to hold the carriage against movement on its transverse guide rail and to hold the relevant abutment arm against movement on the corresponding carriage.

Now the two driving means and the two series of braking means of the device of this invention can be actuated from two control boxes diposed within easy reach of the operator of the machine in his normal position, that is, on the front side of the machine, said control boxes being connected through flexible cables to the electric circuit associated with the members to be controlled. Possibly, these two control boxes may consist of portable casings adapted to be held in the operator's hand, but they may also be mounted in a fixed position on the front of the machine.

Other features and advantages of the device according to this invention will appear as the following description proceeds with reference to the accompanying drawing illustrating diagrammatically by way of example a typical form of embodiment thereof.

FIG. 1 is a perspective view showing a shear equipped with the abutment device of this invention, the upper apron of the machine being removed for the sake of clarity;

FIG. 2 is a fragmentary cross-sectional view showing one of the abutment arms of the present device, the section being taken on a different scale along a vertical plane comprising the line II—II of FIG. 1, and FIG. 3 is a section taken along the line III—III of FIG. 2.

DESCRIPTION OF THE PREFERRED EMBODIMENT

In the example illustrated, the abutment device according to this invention is mounted on a shear designated generally by the reference numeral 1. As already mentioned hereinabove, the upper apron of the machine has been omitted from FIG. 1 in order better to illustrate the structure of the abutment device. This device is disposed in front of the position contemplated for the sheet-plate T to be positioned on the working bed or plane of the corresponding shear. Therefore, this device lies somewhat behind the working bed or plane of the machine tool and comprises a pair of horizontal abutment arms 2 extending and movable depthwise. The stop means proper consist of a pair of keys or feelers each carried by one of said plates 3 at the front end of each abutment arm. Therefore, a very high degree of precision in the positioning of said plate T can be obtained by simply causing the plate T to engage only two keys, that is, only two points of the device. The two abutment arms 2 are movable independently of each other, both depthwise (that is, in the direction of the arrows $Y_1$ and $Y_2$), and transversely (as shown by the arrows $X_1$ and $X_2$).

For this purpose, the abutment arms 2 are mounted on a pair of carriages adapted to travel independently of each other along a horizontal guide rail 4 extending in a transverse direction between the two lateral plates (not shown) of the frame structure of the machine. Thus, this rail 4 extends well behind the working plane or bed of the machine and comprises a pair of parallel U-section members disposed edgewise with their grooves facing each other, a certain gap being left between their coplanar side wings, as illustrated in FIGS. 1 and 3. However, these abutment arms are disposed above, and at right angles to, the transverse rail 4.

The bottom faces of the pair of abutment arms 2 lie in a common horizontal plane, and a certain gap $e$ is left between these arms 2 and the top face of transverse rail 4. Due to their specific structure, these arms 2 are provided with a longitudinal aperture $2a$ similar to aperture $4a$ provided in the top surface of rail 4.

The carriage supporting each one of said abutment arms comprises a horizontal tray 5 disposed within the gap $e$ left between the rail 4 and the relevant arm 2. The function of this tray 5 is to constitute a common support for two series of driving means mounted respectively:

within the rail 4 for imparting a movement of translation of the corresponding carriage in the transverse direction $X_1$ or $X_2$, and within the corresponding arm 2 for moving the latter depthwise in the direction of the arrow $Y_1$ or $Y_2$.

Similarly, the tray 5 of each carriage acts as a common support to two series of braking means adapted:

on the one hand, to hold the relevant carriage against motion on the transverse guide rail 4, on the other hand, to hold the corresponding abutment member 2 against movement with respect to the relevant carriage.

In the example illustrated in FIGS. 2 and 3, the means for driving the corresponding abutment arm 2 in the direction $Y_1$ in relation to its carriage, i.e. in relation to the tray 5, consist of a pair of rollers 6a driven from an electric motor 7a carried by a plate 8a mounted within the arm 2. This plate 8a, though operatively connected to the tray 5 acting as a support thereto, is partially movable in the vertical direction in relation to said tray 5. The plate 8a and tray 5 are interconnected by flexible metal blades 9a so disposed as to prevent any lateral or rotational movements of said plate 8a in relation to said tray 5. On the other hand, spring means 10a are interposed between the tray 5 and plate 8a and constantly urge the plate 8a upwards, the vertical movements of this plate 8a being limited by the provision of coupling studs 11a.

The tray 5 also carries rollers 12a adapted to guide the abutment arm 2 during its movements, but only some of these rollers are illustrated in FIG. 2.

As shown in FIG. 2, the bottom wings 13a of the pair of U-section members constituting the abutment arms 2 are disposed between the tray 5 and plate 8a. Now brake shoes, linings or the like, designated by the reference symbols 14a and 15a, respectively, are cemented or bonded to the registering faces of tray 5 and plate 8a in order to constitute braking means capable of holding the arm 2 against movement in relation to the tray 5.

In the inoperative condition, these brake linings are clampled on either side of the wings 13a of abutment arms 2 by means of a tension cable 16a passing over rollers 17a rotatably mounted on the tray 5 and movable plate 8a (see FIG. 3). This cable 16a is anchored at one end to one point of the arm 2 and at the opposite end to the drum of a winch driven from an electric motor (not shown). When this cable 16a is slackened, the aforesaid springs 10a lift the plate 8a, so that the brake linings are released. On the other hand, the arm 2 is raised by the driving rollers 6a carried by the shaft of motor 7a.

The clearances denoted $j_1$ and $j_2$ are such that the wings 13a of arm 2 are properly centered between the brake linings. Therefore, this arm can easily be driven by the rollers 6a on which it is then caused to bear.

It may also be noted that the flexible blades 9a interconnecting the movable plate 8a and tray 5 permit the vertical movements of the plate during the brake application or the brake release, while positively preventing any lateral or rotational movement of said plate 8a. Since at that time the motor 7a is deenergized, the arm 2 engaging the rollers 6a is held against translation or rotation in relation to tray 5 during the vertical movements of plate 8a.

On the other hand, the blades 9a improve the brake efficiency since they firmly hold the movable plate 8a against lateral movements in relation to said tray 5. In fact, it is an essential requirement that the braking action can hold the abutment arm in the selected position with the maximum precision, for any play in the brake linings or like elements would obviously be detrimental.

The means for driving the carriage forming tray 5 comprise the same mechanical means as those provided for driving the abutment arm in relation to this tray 5. Similarly, the carriage is held against movement on the transverse guide rail 4 by using the same braking means as those contemplated for braking each abutment arm on the corresponding carriage.

As illustrated in FIG. 3, the carriage is driven in relation to the rail 4 by means of rollers 6b driven in turn from a motor 7b carried by a plate 8b mounted inside this rail and adapted to move vertically. This plate 8b is connected to the tray 5 in the same manner as the plate 8a mounted in the abutment arm 2, i.e. by means of a set of flexible connecting blades and of a set of studs provided with spring means constantly urging this plate 8b away from the tray 5.

Brake shoes or linings, or similar elements 14b and 15b, are provided on the faces of tray 5 and movable plate 8b which lie on either side of the upper wings of rail 4. These brake shoes or linings are clamped by means of another cable 16b passing over pulleys carried by the tray 5 and movable plate 8b, respectively, as in the case of the tension cable 16a of the braking means provided within the abutment arm 2.

From the foregoing it is clear that the mode of operation of the carriage drive and of the means for holding the carriage against motion are exactly identical with those contemplated for driving the abutment arm and holding same against motion. The carriages are also guided along the rail 4 in substantially the same manner by means of rollers 12b.

In either case, two electric motors are provided for producing the driving torque and the braking force, respectively. The energizing circuits of these two motors are controlled by switch means enclosed in a control box disposed within easy reach of the operator's hand and connected to the corresponding carriage by a flexible connecting cable.

The abutment device according to this invention comprises two separate control boxes adapted to be actuated by the operator from the front of the machine, i.e. in the normal position of the operator. Advantageously, these control boxes may be of a portable type adapted to be held in the operator's hand, so that the operator can adjust very accurately the position of each abutment member both depthwise and in the transverse direction, indepedently of the other abutment member.

In this respect, it may be pointed out that the depth adjustment distances $Y_1$, $Y_2$ are very frequently identical with each other. However, in certain cases it may be required to adjust these distances separately, notably when it is required to take due account of the self-engagement of stainless steel sheets to be sheared or when the skew shearing or bending operations are required. In any case, the position of the pair of abutment arms must be adjusted very accurately, in the longitudinal direction of said arms, whereas this degree of precision is not necessary in the transverse direction. Besides, this last adjustment can be performed only visually by the operator.

As already mentioned in the foregoing, the device of this invention is intended for equipping machine tools such as shears, bending presses and the like, with a view to afford an accurate positioning of the plates or sheets to be sheared, bent or shaped in these machines.

Of course, the device of this invention should not be construed as being strictly limited by the specific form of embodiment described hereinabove and illustrated diagrammatically in the attached drawing, since various modifications and variations may be brought thereto without departing from the basic principles of the invention as set forth in the appended claims. Thus, for example, the means for braking each abutment member and each carrriage may be driven through elements other than the tension cables 16a and 16b; in this case, cylinder and piston actuators or any other suitable driving or transmission means may be used without departing from the scope of the invention.

I claim:

1. An abutment device for the accurate positioning of a sheet-plate on the working bed of a machine tool such as a shear or bending press, which comprises a pair of parallel spaced abutment arms provided with stop members adapted to be engaged by the rear edge of the sheet-plate and movable depthwise for performing the desired adjustment, and a pair of separate carriages supporting said abutment arms and movable independently of each other on a transverse common supporting rail, wherein each carriage comprises two series of means adapted to drive the relevant carriage along said transverse rail and the corresponding abutment arm depthwise in relation to said carriage, and two series of braking means adapted to hold against motion said carriage in relation to said supporting rail and said abutment arm in relation to its carriage.

2. An abutment device as set forth in claim 1, wherein each abutment arm and said transverse rail consist each of a pair of parallel U-section members spaced from each other and disposed with their grooves in face to face relationship, said abutment arms extending at right angles to, and being somewhat spaced from, said rail, each carriage comprising a horizontal tray disposed in the gap thus left between said abutment arms and said rail, and constituting a common support for said two series of driving and braking means.

3. An abutment device as set forth in claim 1, wherein said transverse rail is hollow and has a longitudinal aperture, wherein each abutment arm is hollow and has a longitudinal aperture, said driving means of each carriage being accommodated partly within said longitudinal aperture of said transverse rail and partly within the longitudinal aperture of the respective one of said abutment arms.

4. An abutment device as set forth in claim 3, each carriage being provided with a horizontal tray, wherein each one of said two series of driving means associated with each carriage is carried by a plate disposed as the case may be either within the transverse guide rail or within the corresponding abutment arm, said plate being connected through flexible means to the horizontal tray of the carriage concerned.

5. An abutment device as set forth in claim 4, said rail and arms having wings, wherein said driving means carrying plate is coupled to the tray of the relevant carriage through coupling means permitting the movement of said plate towards and away from said tray for clamping the corresponding wings of the transverse guide rail or the corresponding wings of the abutment arm, as the case may be, suitable means being also provided for controlling this clamping movement and consequently holding said carriage on said transverse guide rail or said abutment member on the relevant carriage.

6. An abutment device as set forth in claim 5, wherein spring means are provided in each carriage for constantly urging each movable plate away from said tray, the means controlling the clamping or one or the other of said movable plates consisting of tension cables passing over puleys carried by said movable plates, respectively, and by said tray, brake shoes or linings being bonded to the registering faces of said plates and tray adjacent the wings of said guide rail and abutment arm, respectively.

7. An abutment device as set forth in claim 5, wherein said coupling means disposed between said plates and said tray comprise flexible metal blades so disposed as to prevent any lateral movement or any rotational movement of said plates in relation to said tray.

8. An abutment device as set forth in claim 6, wherein said means for driving each abutment arm on the corresponding carriage depthwise comprise an electric motor carried by the corresponding plate located within the relevant abutment arm, said motor being adapted to actuate a pair of rollers for driving the abutment arm, similar means being also provided for driving each carriage along said transverse guide rail.

9. An abutment device as set forth in claim 7, wherein the tray of each carriage is provided with rollers adapted to guide the relevant abutment arm depthwise during its movements, another set of rollers being provided for guiding the carriage along said transverse rail.

* * * * *